Nov. 23, 1948.  J. C. SELDEN  2,454,720
CRANKSHAFT TORSIONAL VIBRATION DAMPER
Filed Jan. 31, 1947  2 Sheets-Sheet 1
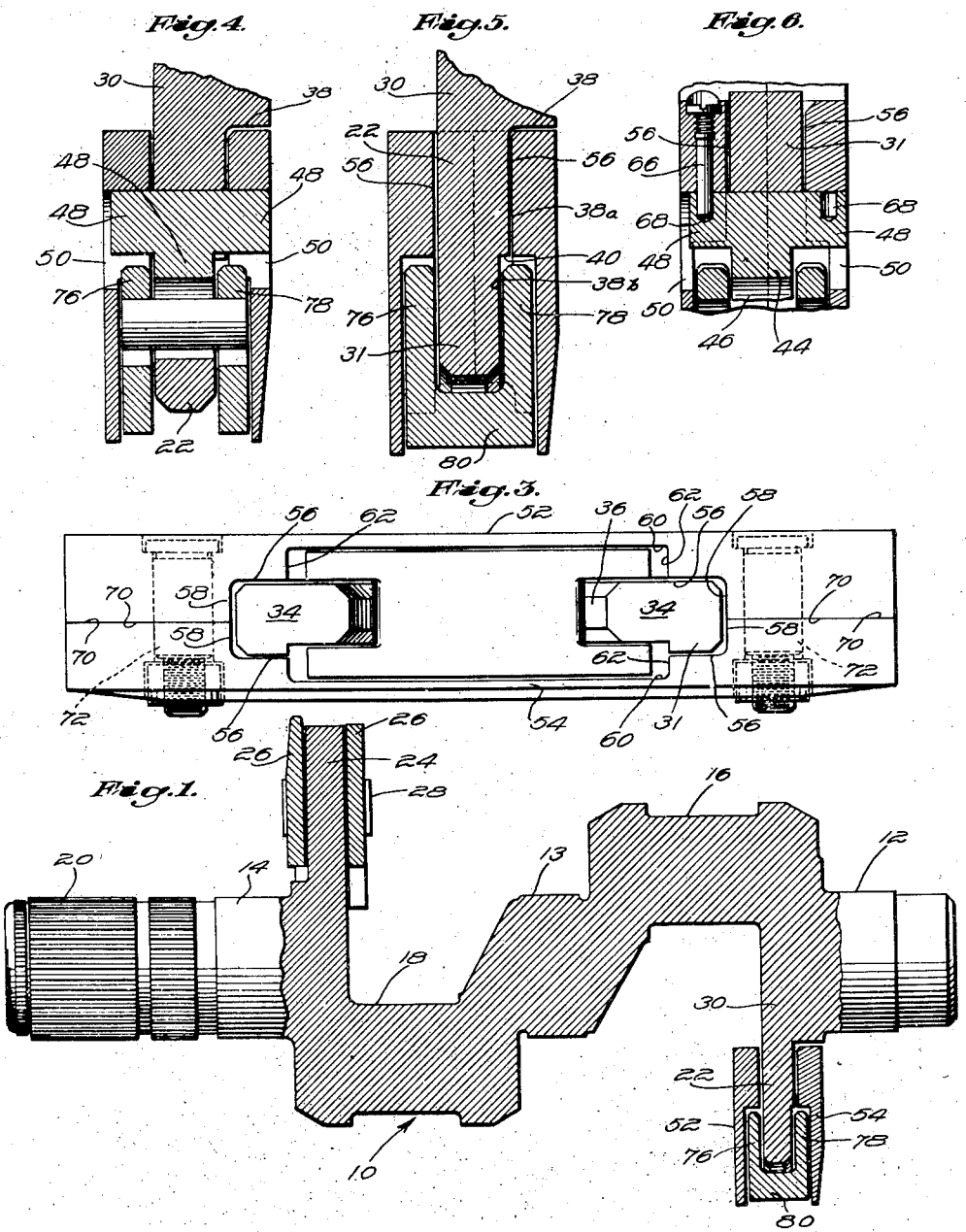
INVENTOR.
John C. Selden
BY Charles A. Warren
Attorney

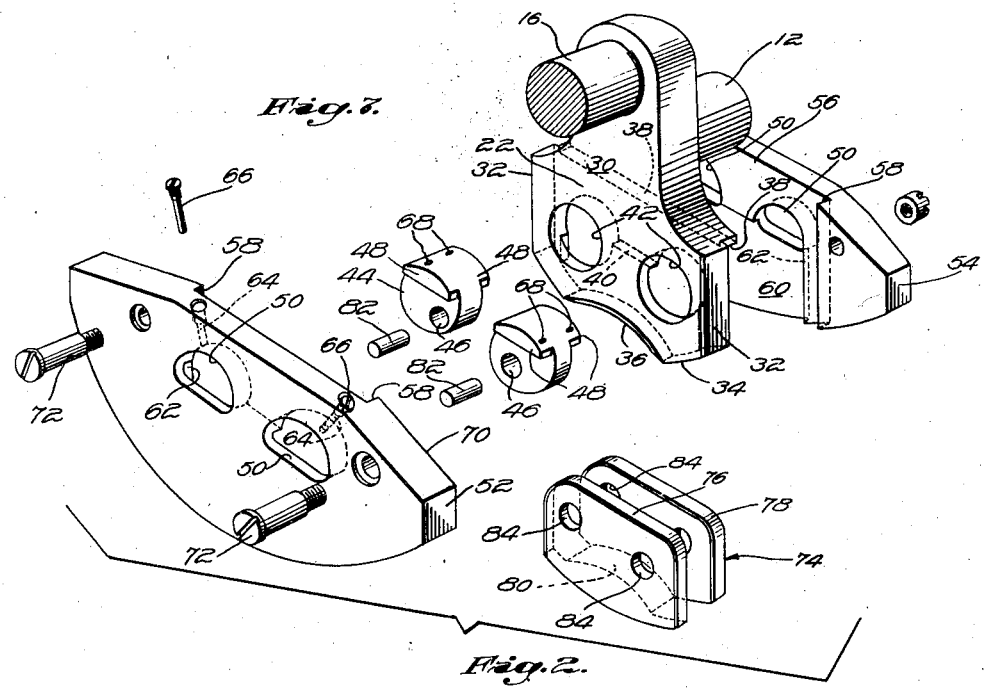

Patented Nov. 23, 1948

2,454,720

UNITED STATES PATENT OFFICE 2,454,720

CRANKSHAFT TORSIONAL VIBRATION DAMPER

John C. Selden, Farmington, Conn., assignor to United Aircraft Corporation, East Hartford, Conn., a corporation of Delaware Application January 31, 1947, Serial No. 725,589

4 Claims. (Cl. 74—604)

1

This invention relates to a particular structural arrangement and improventment of the dynamic damper claimed in the companion application of George L. Williams, Serial No. 725,625, filed January 31, 1947, concurrently herewith. The invention claimed in the Williams application relates broadly to a torsional damper and counterweight combination supported with fore and aft freedom on a rotating shaft, such as a crankshaft. According to the present application the Williams invention may be carried into practice by a novel and improved structure in which the torsional damper is mounted on bearings in the supporting members which carry the counterweight.

In the drawings,

Fig. 1 is a side elevation, partly in section, of the crankshaft of a two-row, radial engine of the type commonly used in aircraft, illustrating the improved dynamic damping means of the invention;

Fig. 2 is an enlarged end view of a radially extended crankshaft arm of Fig. 1 having the improved damping means thereon, with parts broken away and parts shown in section;

Fig. 3 is a bottom plan view of Fig. 2;

Figs. 4, 5, and 6 are sectional views taken on lines 4—4, 5—5, and 6—6, respectively, of Fig. 2; and Fig. 7 is an exploded perspective view of the damper structure and parts of the crankshaft.

Referring to Fig. 1, the numeral 10 indicates generally the crankshaft of a two-row, radial engine of the air-cooled type commonly used for propelling aircraft. Crankshaft 10 has the usual axially aligned main journals 12, 13 and 14 and two diametrically opposed crank portions having connecting rod journals 16 and 18 for the two master rods (not shown) associated with the two rows of cylinders of the engine. The forward end of crankshaft 10 has external splines 20 which cooperate with a correspondingly internally splined driving member of the propeller reduction gearing or other suitable driven member.

Between the journals 12 and 16 the crankshaft is provided with a radial arm 22 extended diametrically opposite to the crank arms for the eccentric journal 16; and between journals 14 and 18 the crankshaft is provided with a radially extended arm 24 which is similarly related to the crank arms of journal 18. Arm 24 is shown as carrying a dynamic damper of conventional design comprising a weight 26 which is supported on a pair of side-by-side pins, one of which is shown at 28. Pins 28 are received loosely in bores (not shown) in arm 24 and the fore-and-

2 aft side walls of damper 26 in a usual manner to provide for the free arcuate movement of the damper relative to the supporting arm 24. Such a damper will effectively control torsional vibrations in the crankshaft 10 unless galling of the damper parts occurs.

The improved damper of this invention is associated with the aft arm 22 on the crankshaft and not only performs the functions of a torsional damper but also suppresses excessive bending vibrations in the crankshaft and eliminates the difficulty of galling of the damper supporting parts.

Referring particularly to Fig. 7, arm 22 beyond the cheek 30 of the crankshaft gradually widens into a damper supporting portion 31 having parallel lateral edges 32 and a generally convex arcuate end 34 provided with a central concave recess 36 therein. The forward face of portion 31 constitutes a plane surface flush with the forward surface of cheek 30 while the aft face of portion 31 is cut away to provide an upper shoulder 38 and a lower shoulder 40 forming the horizontal upper limits of plane surfaces 38a and 38b respectively. Two fore-and-aft extended circular holes, or bores, 42 are provided in portion 31 in which counterweight supporting members 44 are received and freely axially slidable. Each supporting member 44 includes a central annular disc portion of the same fore-and-aft thickness as the thickness of the portion 31 below shoulder 40. Each disc portion has an eccentric hole, or bore, 46 therein and integral fore-and-aft extended shelves 48, the upper surfaces of which conform to the arcuate configuration of the central disc portion thereof. The shelves 48 provide supports for the counterweight by extending into generally semi-circular openings 50 in two complemental parts 52 and 54 of the counterweight which surrounds the portion 31 of the arm. Complemental parts 52 and 54 have confronting recesses therein having side walls 56 and end walls 58 and smaller and deeper recesses having side walls 60 and end walls 62. Part 52 also has oblique passages 64 extending through the upper arcuate surfaces of the two passages 50 into which pins, or stakes, 66 are threaded, and these stakes extend into aligned apertures 68 in the shelves 48. Counterweight parts 52, 54 also have mutually engaging abutment portions 70 through which bolts 72 extend for clamping the counterweight parts firmly together. Thus it will be noted, the supporting members 44 and counterweight parts 52, 54 are rigidly connected and act as a unit.

From Figs. 3 and 5 it will be noted that the well formed by the side walls 56 and the end walls 58 of the complemental recesses receives the supporting portion 31 loosely and that when the pins 66 are located in the aligned holes 64 and 68 a small amount of fore-and-aft movement of the counterweight comprising parts 52, 54 and their supports 44 is permitted relative to arm 22. It will also be noted that the counterweight is spaced slightly below the shoulder 38 so that the counterweight is free to move in a fore-and-aft direction relative to the arm 22 without interference.

A generally U-shaped bifilar damper 74 having side plates 76, 78 and a connecting central web portion 80 which conforms to arcuate recess 36 is suspended from the disc portions of supporting members 44 by means of hardened pins 82 which are loosely received in bores 46 in the supporting members 44 and also loosely received in bores 84 in side plates 76, 78 of the damper. The web portion 80 is such that it connects the side plates 76, 78 in such spaced relation that a clearance with respect to portion 31 is provided which is at least as great as the clearance of the counterweight relative to the arm 22.

From the above description it will be evident that the counterweight members 52, 54 and the supporting members 44 constitute a unit which is torsionally fixed relative to arm 22 but is permitted a limited amount of free fore-and-aft sliding movement relative to said arm in the direction of the axis of the holes 42. As a result, bending vibrations in the crankshaft due to the combination of bending stiffness of the crankshaft and the mass of the crankshaft counterweights are not transmitted to the counterweight.

Torsional vibrations in the crankshaft are suppressed by the pendulous movement of the bifilar damper 74, since torsional virbrations are transmitted from arm 22 directly to the counterweight supporting the damper 74. Since the counterweight does not take part in the fore-and-aft vibrations of arm 22, damper 74 may be supported in the counterweight without tendency toward galling due to fore-and-aft motion.

It will be evident that as a result of this invention a dynamic damper has been provided for an engine crankshaft which is capable of suppressing torsional vibrations while eliminating danger of scuffing, or galling, of the damper supporting surfaces.

It will further be evident that by reducing the mass which is rigidly atached to the crank arm in the fore-and-aft direction the natural frequency in bending of the crankshaft may be raised and danger of resonance in bending in the operating speed range of the engine may be avoided.

While only one embodiment of the invention has been shown and described herein it will be evident that various changes in the construction and arrangement of the parts may be made without departing from the scope of the invention as defined in the claims.

I claim:

1. In a crankshaft damper for suppressing torsional vibrations, an arm extended from the crankshaft in a plane normal to the crankshaft axis, said arm having two bores therein extending parallel with said axis, counterweight means including plates on opposite sides of said arm, means for supporting said plates on said arm including annular members having a sliding fit in said bores, said plate supporting members being rigidly connected with said plates and spacing the latter from said arm to permit limited movement of said arm relative to said plates due to bending vibrations in said crankshaft, a U-shaped bifilial torsional vibration damper supported between said plates and embracing the end of said arm, said damper having bores therein parallel with the passages in said annular supporting members and pins loosely received in the bores in said dampers and in said passages.

2. In a crankshaft damper for suppressing damper vibrations, an arm extended laterally from the fore-and-aft axis of the crankshaft having a pair of bores therein running in a direction parallel with said axis, a pair of spaced counterweight plates on opposite sides of the extended end of said arm, a pair of annular plate bridging members having sliding fits in said bores and rigidly connected at their extremities to said plates, said plates having confronting recesses forming a well into which said arm projects and a U-shaped torsional damper located in said well and straddling said arm, the support for said damper including fore-and-aft passages in said damper and in said plate bridging members and pins loosely received in said passages.

3. In a crankshaft damper for suppressing torsional vibrations, an arm extended laterally from the fore-and-aft axis of the crankshaft having a pair of bores therein running in directions parallel with said axis, counterweight means including a pair of parallel plates loosely embracing the extended end of said arm and plate connecting members rigidly attached to said plates and including annular portions having a sliding fit in said bores, said plates having confronting recessed faces forming a well into which the end of said arm extends, a torsional damper disposed in said well including spaced plates embracing the extended end of said arm, and means for supporting said damper on said counterweight, the support for said damper including parallel passages in said damper plates and in the annular portions of said connecting means and pins loosely received in said passages.

4. In a crankshaft damper for suppressing torsional vibrations, an arm extended from the crankshaft in a plane normal to the crankshaft axis, said arm having two circular bores therein extending parallel with said axis, counterweight means including complemental parts on opposite sides of said arm having passages therein which are aligned with and conform to segmental portions of said bores, a pair of counterweight supporting members bridging said counterweight parts including annular portions having a free sliding fit in said bores and segmental extensions extending into said passages, said annular portions each having an axial bore therein below said extensions, a torsional damper disposed between said counterweight parts including spaced flanges straddling the extremity of said arm, said flanges having bores therein parallel with said crankshaft axis, and pins extending loosely through the axial bores in said members and the bores in said flanges for supporting said damper on said bridging members.

JOHN C. SELDEN.

REFERENCES CITED

The following references are of record in the file of this patent:

UNITED STATES PATENTS

| Number | Name | Date |
| --- | --- | --- |
| 2,272,189 | De Pew | Feb. 10, 1942 |